United States Patent
O'Neill et al.

(10) Patent No.: US 6,912,408 B1
(45) Date of Patent: Jun. 28, 2005

(54) BASE STATION ENCLOSURE FOR INCORPORATION WITH A LIGHT POLE OR STREET FIXTURE

(75) Inventors: Gerard O'Neill, Newbury (GB); Bob Banks, Chiveley (GB)

(73) Assignee: Vodaphone Limited, Newbury (GB)

( * ) Notice: Subject to any disclaimer, the term of this patent is extended or adjusted under 35 U.S.C. 154(b) by 0 days.

(21) Appl. No.: 09/623,303

(22) PCT Filed: Mar. 30, 1999

(86) PCT No.: PCT/GB99/00987

§ 371 (c)(1), (2), (4) Date: Dec. 14, 2000

(87) PCT Pub. No.: WO99/50926

PCT Pub. Date: Oct. 7, 1999

(30) Foreign Application Priority Data

Mar. 31, 1998 (GB) .............................................. 9806924
Nov. 5, 1998 (GB) .............................................. 9824100

(51) Int. Cl.[7] .............................................. H01Q 1/12
(52) U.S. Cl. ...................... 455/561; 455/556.1; 343/890
(58) Field of Search .................... 455/575.1, 575.7, 455/550.1, 561, 562.1, 90.3, 554.1, 347, 556.1, 66.1, 73; 343/890–892, 878, 700 MS, 825, 721; 348/142–156; 52/736.1, 40, 726.4, 737.6, 732.3

(56) References Cited

U.S. PATENT DOCUMENTS

| | | | | |
|---|---|---|---|---|
| 4,656,804 A | * | 4/1987 | Foissac et al. ........... | 52/309.16 |
| 4,791,290 A | * | 12/1988 | Noone et al. ............. | 250/239 |
| 4,864,784 A | * | 9/1989 | Binge et al. ............. | 52/108 |
| 5,349,362 A | | 9/1994 | Forbes et al. | |
| 5,375,353 A | | 12/1994 | Hulse | |
| 5,625,369 A | | 4/1997 | Newman | |
| 5,637,963 A | * | 6/1997 | Inoue et al. ............. | 315/248 |
| 5,641,141 A | * | 6/1997 | Goodwin ................. | 248/218.4 |

(Continued)

FOREIGN PATENT DOCUMENTS

| | | |
|---|---|---|
| EP | 0 688 040 | 6/1995 |
| EP | 0710999 | 5/1996 |

(Continued)

OTHER PUBLICATIONS

Irish oppose orange progression, Digital Cellular Report, Dec. 18, 1997, vol. 3, No. 25, Phillips Business Information, Inc.

P. Constantinou, Mobile Communication, Channel Modelling, British Telecommunications Engineering Journal, Aug. 1990, pp. 84–85, vol. 19, Unwin Brothers Limited, Great Britain.

(Continued)

*Primary Examiner*—Pablo N. Tran
(74) *Attorney, Agent, or Firm*—Leydig, Voit & Mayer, Ltd.

(57) ABSTRACT

A conventional lamp post comprises a mast (5) carrying a lamp unit (6) and with an enclosure (8) at its base, incorporating power and control circuitry for the lamp unit (6). In addition, however, one or more antennas (10, 12) for the base station of a cellular telephone system is or are mounted on the mast (5). The circuitry for the base station is mounted in an enclosure (14) which is immediately adjacent to the base of the lamp post and electrically connected to the antenna (10, 12). By incorporating the components of the base station on and immediately adjacent to the lamp post, a base station can be located within an urban environment and with minimal physical or visual impact. Any other suitable item of normal street furniture can be used instead of a lamp post. The circuitry of the base station can be incorporated in the item of street furniture itself, instead of in a separate enclosure (14). Some of the circuitry of the base station is common with some of the circuitry for the street furniture.

15 Claims, 4 Drawing Sheets

U.S. PATENT DOCUMENTS

| | | | |
|---|---|---|---|
| 5,657,008 A | | 8/1997 | Bantli |
| 5,673,886 A | | 10/1997 | Negishi |
| 5,926,145 A | | 7/1999 | Honma |
| 5,963,178 A | * | 10/1999 | Jones .......................... 343/890 |
| 6,173,537 B1 | * | 1/2001 | Davidsson et al. ............ 52/40 |
| 6,222,503 B1 | * | 4/2001 | Gietema et al. ............ 343/890 |
| 6,380,909 B1 | * | 4/2002 | Wilkinson et al. .......... 343/890 |
| 6,452,566 B1 | * | 9/2002 | Altschul ..................... 343/890 |
| 6,483,470 B1 | * | 11/2002 | Hohnstein et al. .......... 343/721 |

FOREIGN PATENT DOCUMENTS

| | | | |
|---|---|---|---|
| EP | 0 875 956 | | 11/1998 |
| GB | 2219891 | | 12/1989 |
| GB | 2289827 | | 11/1995 |
| JP | 4223724 | | 8/1992 |
| JP | 04238424 A | | 8/1992 |
| JP | 06053894 A | | 2/1994 |
| JP | 10041873 | | 2/1998 |
| WO | WO 96/11352 | | 4/1996 |
| WO | WO 98/10529 | | 3/1998 |
| WO | WO 98/13945 | | 4/1998 |
| WO | WO 200175849 A2 * | 10/2001 | ............. E04C/3/30 |

OTHER PUBLICATIONS

B. Gudmundson et al., Handoff in Microcellular Based Personal Telephone Systems, Third Generation Wireless Information Networks, 1992, pp. 187–203, Kluwer Academic Publishers.

K. Fujimori et al, Polarization Characteristics Under Street Microcells Including Radiation Pattern of Base Station, IEE Colloquium on Customer Access the Last 1.6 km, Jun. 1, 1993, pp. 376–377, Institution of Electrical Engineers London, England.

H.M. Foster et al., High Speed Data Transmissions From Pole to Buildings, Virginia Tech's Third Symposium on Wireless Personal Communications, Jun. 9–11, 1993, pp. 9/1–6.

D.C. Smith, Mobility for the masses; personal communication services, Telephony, Aug. 2, 1993, vol. 225, No. 5, p. 28, Information Access Company and Intertec Publishing Company.

F.K. Goryance, The Changing Landscape of Cell Sites, Cellular Business, May 1994, vol. 11, No. 5, pp. 20–28, Intertec Publishing Corp., Overland Park KA.

M. Wang et al., Projecting the Growth of Cellular Communications, Communications of the ACM, Oct. 1995, vol. 38, No. 10, p. 119, Information Access Company and Association for Computing Machinery, Inc.

B. Susnjara, Lake Forest Eyes Future of Telecommunications, News Sun, Apr. 9, 1996, p. AI, UMI Inc., Waukegan, Illinois.

Samsung Designs Pico Base Station For Cheap Deployment, Radio Communications Report, Jan. 19, 1998, p. 3, Crain Communications, Inc.

S. Marek, More than meets the eye; designs of cellular radio transmission sites, Cellular Marketing, Jun. 1993, vol. 8, No. 6, p. 32, Information Access Company and Cardiff Publishing Company.

Good Communication Would Benefit Cellular Site Debate; Compromises Between Open Space, Technical Needs is Key, Los Angeles Times, Metro, part B, p. 19, Times Mirror Company, Ventura County, California.

J. Meyers, Tales of the City, Telephony, Wireless Networks, Jul. 7, 1997, Primedia Business Magazines and Media, Inc.

I. Symington, A Race for Freedom, Communications International, Oct. 1990, vol. 17, No. 10, pp. 49–51, Periodical Publishers Association, International Thompson Publishing, Ltd., England.

V. Erceg, Microcell Size and Architecture Analysis From the Propagation and Capacity Points of View, IEEE 44th Vehicular Technology Conference, Jun. 8–10, 1994, vol. 1, pp. 215–219, Stockholm, Sweden.

R. Hall et al., Modeling and Design of Circularly–Polarized Cylindrical Wraparound Microstrip Antennas, IEEE Antennas and Propagation Society International Symposium Digest, Jul. 21–26, 1996, pp. 672–675, vol. 1, Baltimore, MD.

R. Desloge, Zoning issues: The latest cross to bear for wireless firms, St Louis Business Journal, Apr. 28, 1997, vol. 17, No. 33, p. 10B, UMI, Inc., St. Louis, Missouri.

Transmitters Installed, Waikato Times (Hamilton), Oct. 3, 1997, p. 3, Independent Publishers Ltd.

P. Matthias, Micro cell sites proposed, The Press (Christchurch), Dec. 3, 1997, p. 4, The Christchurch Press Company Limited.

J.E. Guyette, Wireless modems landing at airports, Automatic ID News, Aug. 1997, p. 40, Adavanstar Communications Inc., and Information Access Company.

E.V. Mooney, Success in Seattle leads Metricom System to DC, RCR Radio Communications Report, Sep. 9, 1996, vol. 15, No. 36, p. 19, Responsive Database Services, Inc. and Crane Communications, Inc.

R. Leyshon, Millimeter Technology Gets a New Lease on Life, Microwave Journal, Mar. 1992. vol. 35, No. 3, pp. 26, 28, 30, 32 and 35, Horizon House.

* cited by examiner

BASE STATION ENCLOSURE FOR INCORPORATION WITH A LIGHT POLE OR STREET FIXTURE

The invention relates to an enclosure for the circuitry of a base station of a cellular telephone system which receives signals from and supplies signals to an antenna of the system, in which the enclosure includes further circuitry for controlling an item of street furniture.

The invention also relates to an item of street furniture, additionally incorporating or carrying an antenna for a base station of a cellular telephone system, in combination with an enclosure for containing the circuitry of the base station, the enclosure being the same enclosure which includes circuitry for use in the principal function of the item of street furniture.

Such an enclosure is shown, for example, in EP-A-0 710 999. In this case, the enclosure is a telephone booth which includes circuitry for the base station of the cellular telephone system, the booth carrying an antenna for the cellular telephone system and also including circuitry for the public telephone in the telephone booth.

Such an enclosure is also shown in WO 98 10529. Here, the enclosure includes circuitry for the base station of a cellular telephone system and also includes further circuitry for supplying power to an item of street furniture which is in the form of a street lamp also carrying an antenna for the cellular telephone system.

In the known enclosures, they simply act as a container for the circuitry of the base station and for the item of street furniture (the public telephone or the street lamp). The invention aims to provide more effective use of such an enclosure.

Accordingly, the enclosure as first set forth above is characterised in that part of the circuitry of the base station is common to part of the further circuitry.

In another aspect, the invention also relates to an item of street furniture, additionally incorporating or carrying an antenna for a base station of a cellular telephone system, in combination with an enclosure for containing the circuitry of the base station, the enclosure being the same enclosure which includes circuitry for use in the principal function of the item of street furniture.

Such an item of street furniture is shown, for example, in EP-A-0 710 999 referred to above, where it takes the form of the public telephone, and in WO 98 10529, also referred to above, where it takes the form of the street lamp. The invention in its second aspect aims to make more efficient use of the juxtaposition of the item of street furniture (public telephone or street lamp) and the base station of the cellular telephone system. Accordingly, the item of street furniture as first set forth above is characterised in that at least part of the circuitry for the base station is common with part of the circuitry for the principal function of the item of street furniture.

Cellular telephone base stations and antenna arrangements embodying the invention will now be described, by way of example only, with reference to the accompanying drawings in which.

Figure 1:
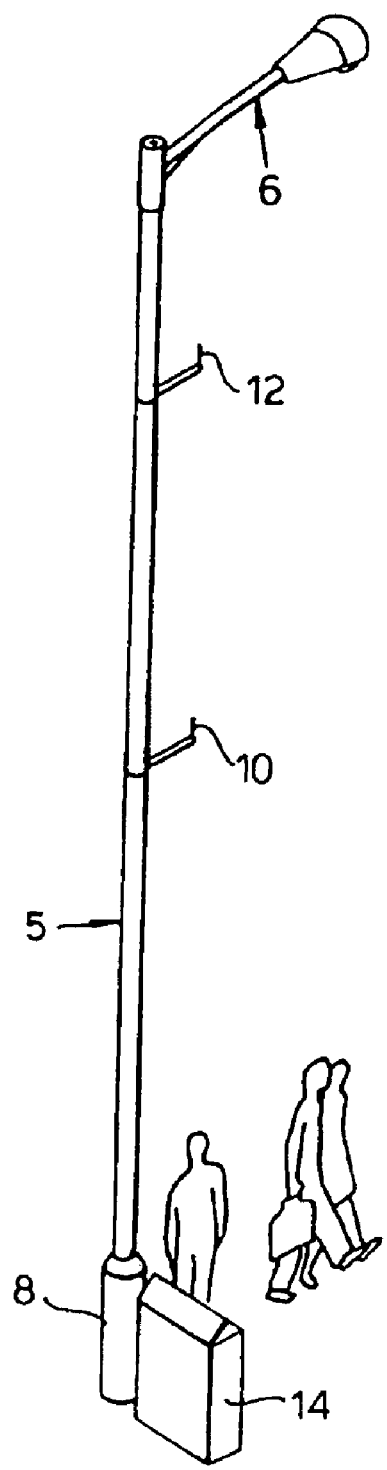
FIG. 1 is a perspective view of one embodiment of the invention.

Cellular telephone systems require a number of geographically distributed base stations each having a transmitting and receiving antenna by means of which radio signals are transmitted to and from mobile cellular telephones temporarily located within the area covered by the base station. Such signals include signals to and from the mobile telephone for registering its presence within that particular area and for use in recording that location in a visitor location register or in some other part of the system, signals for authenticating the mobile telephone to enable calls to be made to and from it, signals carrying voice, data or other digital information from the mobile telephone or other such equipment to other telephones (mobile or fixed), and signals carrying voice, data or other digital information from such other telephones to the mobile telephone or other such equipment. When the mobile telephone moves from within the transmitting/receiving area of the antenna of one base station and into the corresponding area of another base station, the mobile is "handed over" to the new base station. To provide effective operation of a mobile telephone it is of course essential that base stations and their associated antennas be positioned sufficiently close together to provide uninterrupted operation, taking account of the local environment. In particular, problems can arise in urban environments. Firstly, large and solid buildings within an urban environment may limit the effective range of each base station, requiring the base stations to be closer together than they might be in a more open or rural environment. Secondly, local planning authorities may be very reluctant to allow a proliferation of base stations and their associated antennas within urban, suburban or rural environments.

According to a feature of the embodiments being described, therefore, at least part of a base station-antenna combination is located in and/or on an item of street furniture—such as (for example) a lamp post, a support post for close circuit television (CCTV) apparatus, posts for traffic lights, direction signs or road signs in general, shop signs, litter bins and any other suitable item of street furniture—or an item forming part of the structure of a building such as a rain-water drain pipe. In this way, therefore, a base station-antenna combination can be physically situated within an urban environment without having substantially any additional physical or visual effects on the environment. Thus, the item of street furniture, or being part of the structure of a building, on which the base station-antenna combination is mounted, or in which part only of that combination is mounted, is present in the environment or is already accepted into the environment due to its appearance, and the additional visible part may only comprise the base station antenna which is small and of minimal visual impact. In many cases, the circuitry of the base station may be incorporated in an enclosure which is already part of the item of street furniture—for example, the enclosure forming the lower part of a lamp post or a CCTV post as will be described in more detail below.

FIG. 1 shows a lamp post comprising a mast 5 carrying a lamp unit 6 and having an enlarged enclosure 8 at its foot which will include control circuitry for the lamp unit 6 such as its power supply and a timer or possibly a photo-electric control unit. In accordance with a feature of the invention, one or more antennas 10,12 is also mounted on the mast 6, these antennas being antennas of a base station of a cellular telephone system. In this embodiment, the circuitry of the base station is mounted in an additional enclosure 14 which is positioned on the ground, adjacent the foot of the mast 5 and is connected to the antennas 10,12.

The antennas 10,12 are small in size and mounted considerably above pedestrians and traffic. They will therefore have minimal visual impact. The enclosure 14 is also small in size and of standard street furniture appearance. Because of this, and because it is mounted immediately adjacent the foot of the lamp post mast 5, it also will have only a small physical and visual impact.

In a modification, however, the circuitry of the base station can be mounted within the enclosure 8 of the lamp post itself, instead of in a separate enclosure 14. In such a case, it may be necessary to enlarge the enclosure 8 but this may be done to an extent which is hardly noticeable.

In another modification, the enclosure 14 is not mounted immediately adjacent to the lamp post but is mounted a short distance away, such as on, in or immediately adjacent to a neighbouring building and connected to the lamp post and the antennas 10,12 via connections under the pavement or roadway. If such an enclosure 14 is mounted outside the building, it can be shaped and coloured, relative to the shape and colour of the building, so that, again, it has minimal physical or visual impact.

Figure 2:
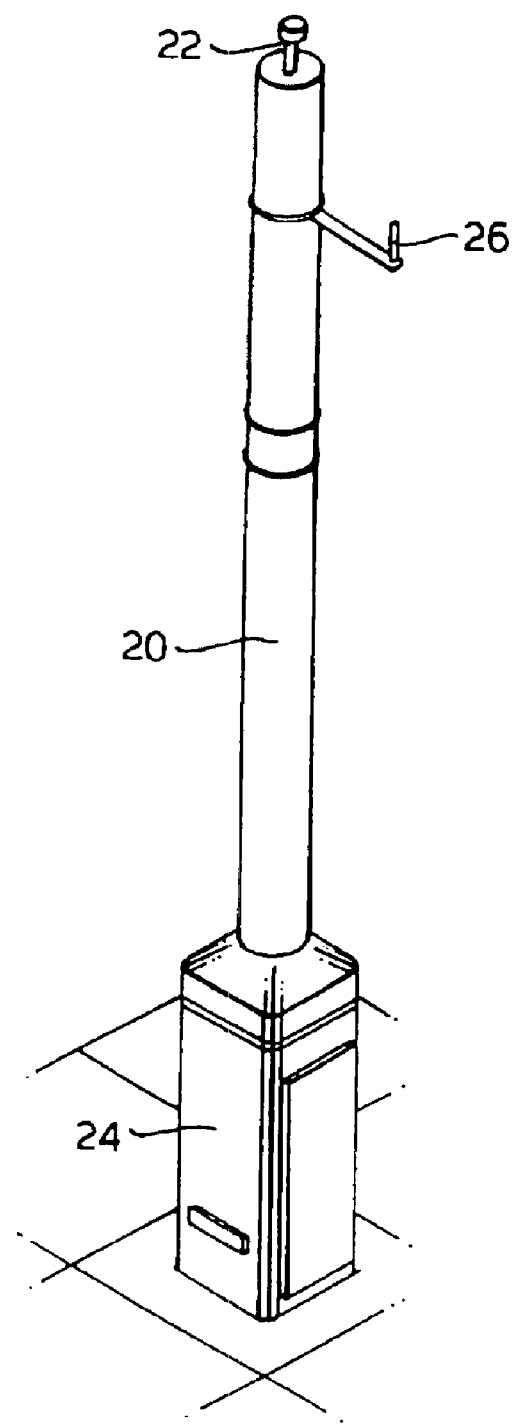
FIG. 2 is a perspective view of another embodiment of the invention.

In FIG. 2, a mast 20 for supporting a CCTV camera 22 has an enclosure 24 in which is located the control and power circuits for the camera, such as for energising and adjusting the attitude of the camera. In accordance with a feature of the invention, the mast 20 also carries an antenna 26 which is the antenna of a cellular telephone base station. In this example, the circuitry for the base station can be located within the enclosure 24 if it is of a suitable size. Again, however, the circuitry for the base station could be incorporated within a separate enclosure located either immediately near the enclosure 24 or at some other location where its physical and visual impact is small.

In the case of the embodiment shown in FIG. 2, where the enclosure 24 will incorporate circuitry of some complexity for energising and controlling the CCTV camera 22, it may advantageously be possible to arrange for at least some of the circuitry for the camera and for the base station to be common—such as the power supply and perhaps some of the processing circuitry for the signals to be transmitted to and from a distant location. The use of such common circuitry enables the size of the enclosure 24 to be reduced.

Figure 3:
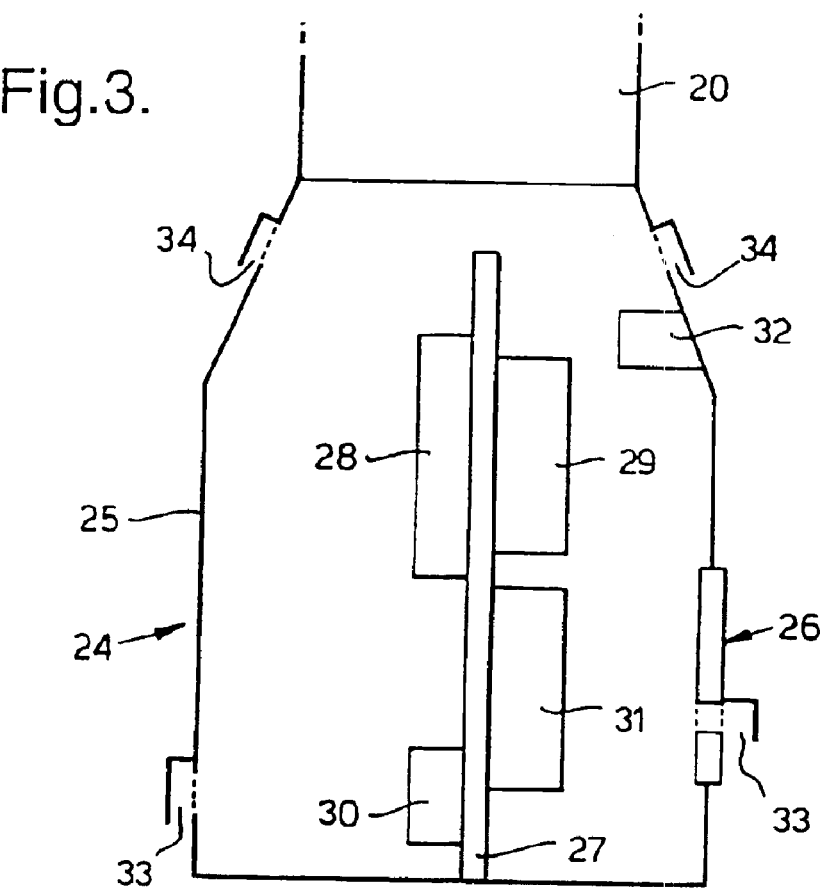
FIG. 3 is an internal view of a housing forming part of the embodiment illustrated in FIG. 2.

FIG. 3 illustrates an internal view of one form which the housing 24 can take. As shown, it comprises a metal casing 25 having an access door 26 and with a vertically arranged support plate 27. The latter carries a number of circuit units. Unit 28 is the circuitry for the base station. Unit 29 is the circuitry for the CCTV camera 22. These units are of course connected to the antenna 26 and to the camera 22 respectively (see FIG. 2).

Each unit 28,29 requires a power supply. Power is obtained from a common power supply unit 30 which is energised by the local mains supply (normally via an underground connection, not shown) and provides the appropriate output supplies for the units 28 and 29.

Each unit 28,29 also requires input and output signal lines. Thus, the base station unit 29 receives input signals for controlling its operation and for carrying telecommunications signals between the base station and the central switch of the cellular telephone system (that is, signals relating to telephone calls made to and by the mobile telephones within the cell serviced by the base station). The camera 22 receives input signals for controlling its operation and produces output signals carrying the camera output to the central monitoring station. These input and output signals to and from the units 28 and 29 are supplied via the local PSTN network, through a unit 31. Unit 31 is connected to the local PSTN lines (normally by underground connections, not shown), and feeds the appropriate signals to and receives them from the units 28 and 29. A significant amount of the circuitry in the unit 31 is common to the operation of the base station and the camera.

Because the power unit 30 and the signalling unit 31 are common to the base station unit 28 and the CCTV unit 29, efficient use is made of the space within the housing 24 which can thus be of minimum size.

Advantageously, the housing 24 is provided with a cooling system to limit any rise in temperature caused by heat generated by the equipment within the housing and by the external ambient temperature. As shown in FIG. 3, this cooling may be provided by a fan 32 which draws fresh air into the casing 25 through inlet grills or openings 33 and blows hot air out through exit grills or openings 34. It is found that satisfactory cooling can be achieved, without generating more than minimal noise. Instead, however, more sophisticated air management or cooling may be provided, such as air-conditioning and possibly including means for controlling the ambient temperature within the enclosure.

In a modification of the housing 24 of FIG. 3, for use with a lamp post such as shown in FIG. 1, the unit 29 which in FIG. 3 controls the camera 22 may be replaced by a unit which controls the lamp 6. This unit would receive power from the common power supply 30 and could receive control signals via the unit 31. Again, such a housing could be provided with a cooling fan and grills or openings like the housing 24 of FIG. 3, or more sophisticated air management or cooling arrangements, such as air-conditioning and temperature control arrangements.

Figure 4:
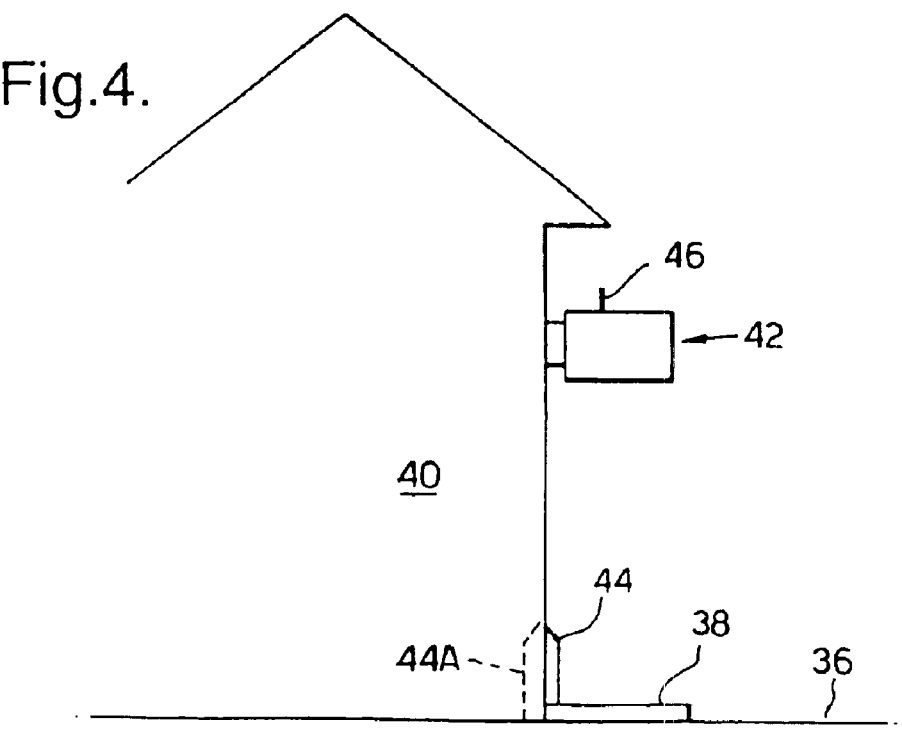
FIGS. 4,5,6,7 and 8 are elevational views of further embodiments.

FIG. 4 shows a view along a road within an urban environment, showing the road surface 36, the pavement 38, and a building 40 carrying a sign 42 such as bearing the name of a shop in the building or being some other advertising or informational sign for example. The Figure shows an enclosure 44 in which is incorporated the circuitry of a base station for a cellular telephone system. The circuitry is connected via suitably concealed connections to an antenna 46 mounted on or in the sign 42. Again, therefore, the antenna 46 has minimal physical and visual impact or is invisible, and the enclosure 38 is designed to achieve the same end. The enclosure may incorporate circuitry associated with the sign 42, and some of this circuitry may be common with some of the circuits for the base station.

In an advantageous modification of the arrangement shown in FIG. 4, the enclosure 44 may be located within the building so as to have no external physical or visual impact, as shown dotted at 44A.

Figure 5:
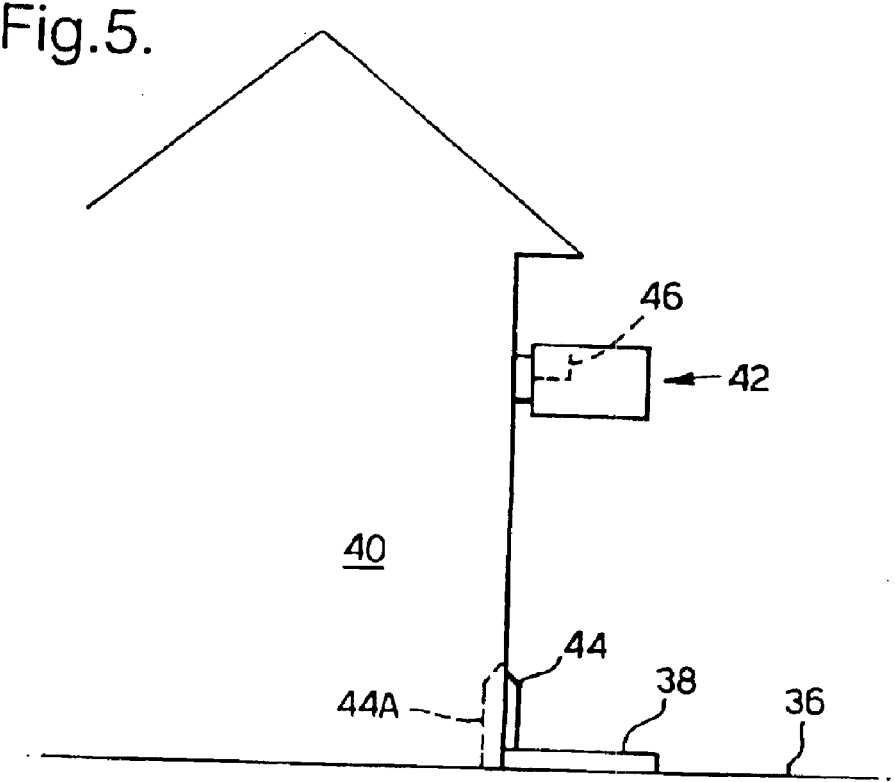

FIG. 5 shows a modification of the arrangement shown in FIG. 4. In FIG. 5, the antenna is shown dotted at 48, being mounted within the sign 42 and therefore completely invisible.

Figure 6:
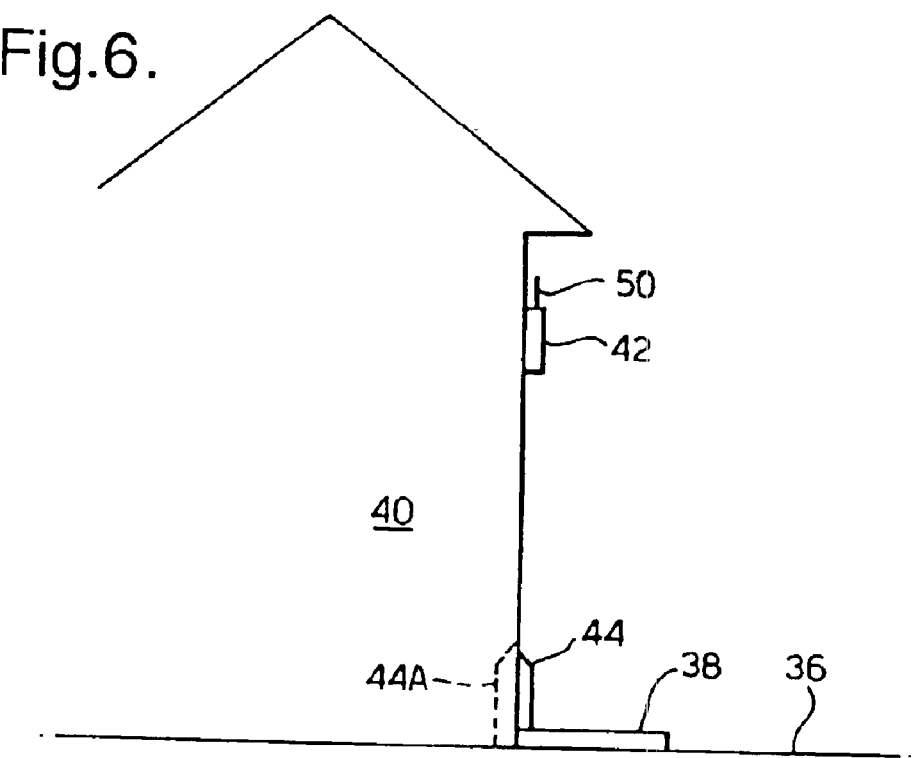
Figure 7:
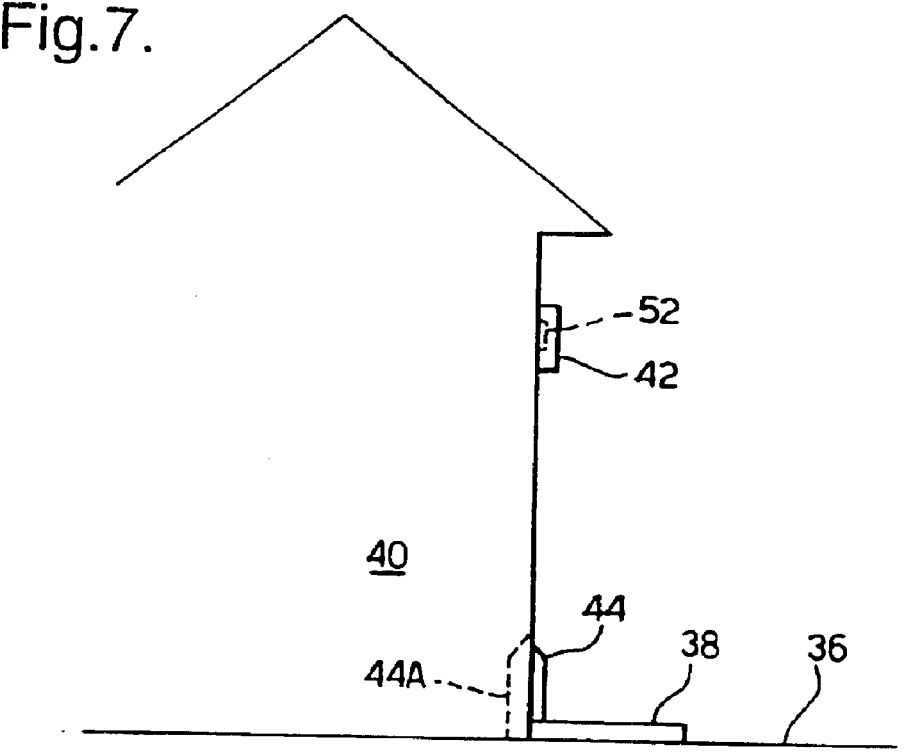

In the embodiments shown in FIGS. 6 and 7, the sign 42 is mounted flat on the front face of the building and is therefore shown in end view in these Figures. In FIG. 6, the antenna is shown at 50 and is mounted externally on the sign. In FIG. 7, the antenna is shown dotted at 52 and is mounted within the sign.

In the embodiments shown in FIGS. 4 to 7, a miniaturised version of the base station circuitry may also be incorporated in or on the sign.

Figure 8:
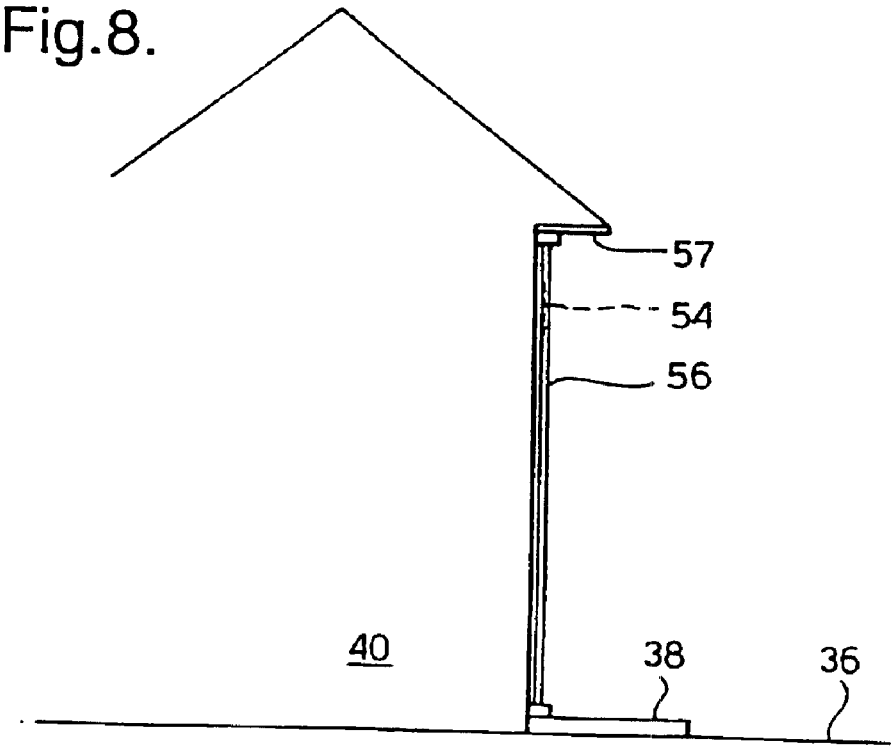

FIG. 8 shows another modification. In FIG. 8, the antenna 54 is mounted within a rain water drain pipe shown at 56. The drain pipe 56 may be an actual drain pipe of the building, such as serving a gutter 57, or it may be an artificial drainpipe, that is, a hollow pipe attached to the external surface of the building to provide a housing for the antenna but not actually performing the function of a drain pipe. In either case, the presence of the antenna within the drain pipe will not be externally visible. The base station may be positioned as shown at 44 or 44A in FIGS. 4 to 7 or elsewhere, such as within the building itself. The antenna 54 may be mounted within the drain pipe in any suitable way so as to extend vertically within it.

It will be appreciated that many modifications can be made. In particular, and using the principles disclosed, antennas for cellular telephone base stations can be mounted on or in a variety of other types of street furniture, and either the circuitry for the base station can be also incorporated therein or a circuitry for the base station can be located at a suitable adjacent point such as outside or inside a neighbouring building.

What is claimed is:

1. A mast,
   a closed circuit television camera carried by the mast,
   said mast additionally incorporating or carrying an antenna for a base station of a cellular telephone system,
   said mast being in combination with an enclosure for containing the circuitry of the base station,
   said enclosure also including circuitry for use with the closed circuit television camera,
   in which at least part of the circuitry of the base station is common with part of the circuitry for use with the closed circuit television camera, and
   in which the common part of the circuitry includes processing circuitry for carrying signals to or from the base station circuitry and the circuit for the closed circuit television camera.

2. A mast according to claim 1, in which the common part of the circuitry includes power supply circuitry.

3. The mast according to claim 2, wherein the processing circuitry is adopted to carry signals to a distant location from the base station circuitry and the circuitry for use with the closed circuit television camera, and from the distant location to the base station circuitry and the circuitry for use with the closed circuit television camera.

4. The mast according to claim 2, in which the power supply circuitry is energized by a local mains supply and provides an appropriate output supply to elements of said circuitry for use with the camera and to elements of said circuitry of the base station.

5. A mast according to claim 1, which is associated with but physically separate from the enclosure.

6. A mast according to claim 1, which is physically combined with the enclosure.

7. A mast according to claim 1, including means for cooling or ventilating the interior of the enclosure.

8. A mast according to claim 7, including means for controlling the ambient temperature in the enclosure.

9. The mast according to claim 1, wherein the processing circuitry is adapted to carry signals to a distant location from the base station circuitry and the circuitry for use with the closed circuit television camera, and from the distant location to the base station circuitry and the circuit for the closed circuit television camera.

10. The mast according to claim 1, in which the circuitry of the base station receives input signals for controlling its operation and for carrying output telecommunications signals between the base station and a central switch of the cellular telephone system.

11. The mast according to claim 1, in which the circuitry for the closed circuit television camera receives input signals for controlling the camera and produces output signals carrying an output of the camera to a monitoring station.

12. The mast according to claim 10, in which the input and output signals of the circuitry of the base station are supplied via a PSTN network.

13. The mast according to claim 11, in which the input and output signals of the circuitry for use with the closed circuit television camera are supplied via a PSTN network.

14. The mast according to claim 13, including a unit connected to the PSTN network for feeding input signals to and receiving output signals from the circuitry of the base station and the circuitry for use with the closed circuit television camera.

15. A mast according to claim 1, in which the processing circuitry for carrying signals to or from the base station circuitry and the circuitry and the circuit for the closed circuit television camera is for carrying signals to a distant location from the base station circuitry and the circuit for the closed circuit television camera, and from the distant location to the base station circuitry and the circuit for the closed circuit television camera.

* * * * *